(12) United States Patent
Chang

(10) Patent No.: US 7,367,704 B1
(45) Date of Patent: May 6, 2008

(54) LIGHT GUIDE PLATE AND BACKLIGHT MODULE USING SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/608,640

(22) Filed: Dec. 8, 2006

(30) Foreign Application Priority Data

Oct. 27, 2006 (CN) .................... 2006 1 0063339

(51) Int. Cl.
*F21V 7/04* (2006.01)
(52) U.S. Cl. .............. 362/621; 362/612; 362/613; 362/610; 385/901; 349/68
(58) Field of Classification Search ............... 349/65, 349/68; 362/27, 511, 608, 610, 612, 613, 362/621, 625, 626; 385/33, 129, 146, 901
See application file for complete search history.

(56) References Cited

U.S. PATENT DOCUMENTS

| 6,305,813 | B1 * | 10/2001 | Lekson et al. | 362/625 |
| 6,623,132 | B2 * | 9/2003 | Lekson et al. | 362/27 |
| 2006/0139953 | A1 * | 6/2006 | Chou et al. | 362/613 |

* cited by examiner

*Primary Examiner*—Stephen F Husar
(74) *Attorney, Agent, or Firm*—Jeffrey T. Knapp

(57) ABSTRACT

A light guide plate includes having a block body includes a bottom surface, a light emitting surface on an opposite side of the light guide plate to the bottom surface, at least three spaced light incident surfaces, and at least three fresnel lens portions provided on the respective at least three light incident surfaces of the block body. A backlight module with the light guide plate and at least three light sources is also provided.

14 Claims, 7 Drawing Sheets

LIGHT GUIDE PLATE AND BACKLIGHT MODULE USING SAME

BACKGROUND OF THE INVENTION

1. Field of the Invention

The present invention relates to optical elements and light source devices and, more particularly, to a light guide plate and a backlight module using the same.

2. Description of Related Art

At present, colorful display devices are popular with cell phones and personal digital products. Various colorful display devices have been developed. Passive display devices, such as liquid crystal display (LCD) devices adopting thin film transistors (known as "TFT-LCD"), become a main aspect of the display market. However, with development of technology, active display devices, such as organic light emitting diode (OLED) display devices have started to reach the display market. Performance of LCD devices, such as color saturation and brightness, etc. therefore needs to be enhanced.

As a passive device, a typical LCD device generally includes a backlight module to illuminate the LCD device. The backlight module is used to convert linear light sources such as cold cathode ray tubes, or point light sources such as light emitting diodes (LEDs), into area light sources having high uniformity and brightness.

If LEDs are introduced as point light sources to the backlight module, the LED is generally only a white LED or a single-color LED. However, this does not meet the requirement for colorful light sources for improving the LCD device.

What is needed, therefore, is a light guide plate and a backlight module for providing better color saturation and brightness.

SUMMARY OF THE INVENTION

In one preferred embodiment of the present invention, a light guide plate having a block body includes a bottom surface, a light emitting surface on an opposite side of the light guide plate to the bottom surface, at least three spaced light incident surfaces adjoining the bottom surface, and at least three fresnel lens portions provided on the respective at least three light incident surfaces of the block body.

In another preferred embodiment of the present invention, a backlight module includes a light guide plate having a block body and at least three light sources. The light guide plate having a block body includes a bottom surface, a light emitting surface on an opposite side of the light guide plate to the bottom surface, at least three spaced light incident surfaces adjoining the bottom surface, and at least three fresnel lens portions provided on the respective at least three light incident surfaces of the block body. Each of the light sources faces toward the respective three spaced light incident surfaces.

Advantages and novel features will become more apparent from the following detailed description of the present light guide plate and its related backlight module, when taken in conjunction with the accompanying drawings.

BRIEF DESCRIPTION OF THE DRAWINGS

Many aspects of the present light guide plate and its related backlight module can be better understood with reference to the following drawings. The components in the drawings are not necessarily drawn to scale, the emphasis instead being placed upon clearly illustrating the principles of the present light guide plate and its related backlight module. Moreover, in the drawings, like reference numerals designate corresponding parts throughout the several views.

Figure 1:
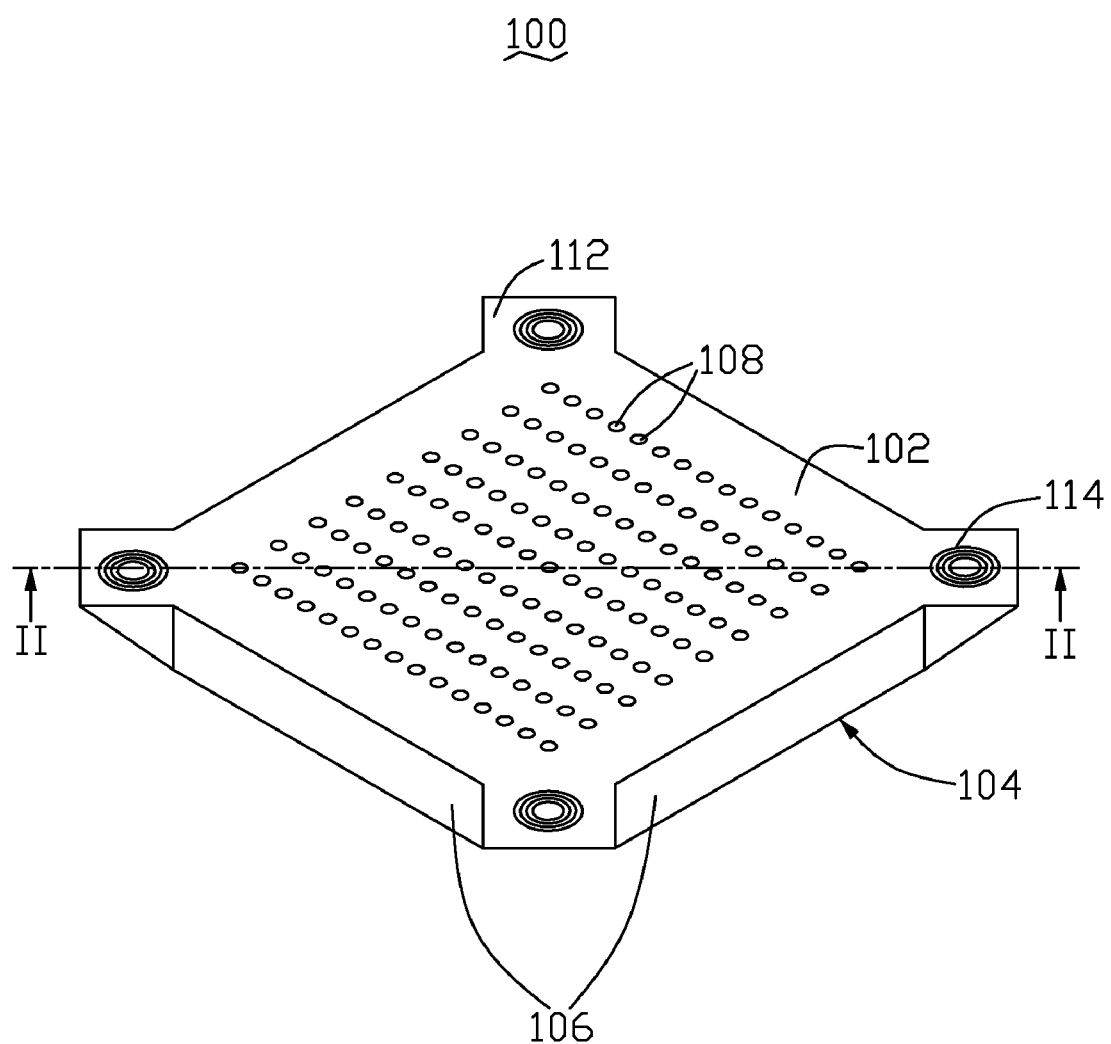
FIG. 1 is an isometric view of a light guide plate according to a first preferred embodiment.

Corresponding reference characters indicate corresponding parts throughout the drawings. The exemplifications set out herein illustrate at least one preferred embodiment of the present light guide plate and its related backlight module, in one form, and such exemplifications are not to be construed as limiting the scope of the invention in any manner.

DETAILED DESCRIPTION OF THE INVENTION

Reference will now be made to the drawings to describe preferred embodiments of the light guide plate and its related backlight module.

Figure 2:
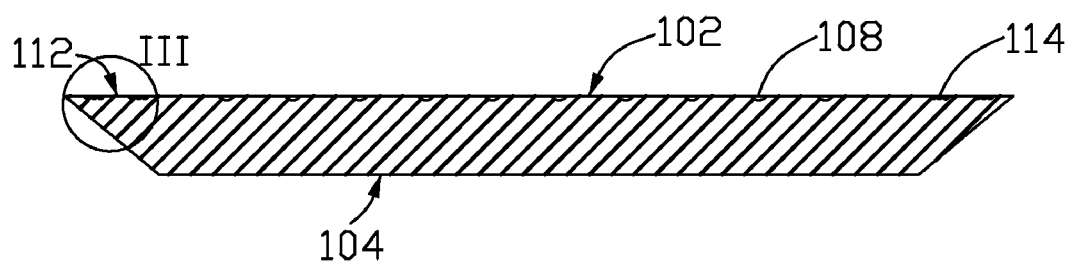
FIG. 2 is a cross-sectional view taken along line II-II of FIG. 1
Figure 3:
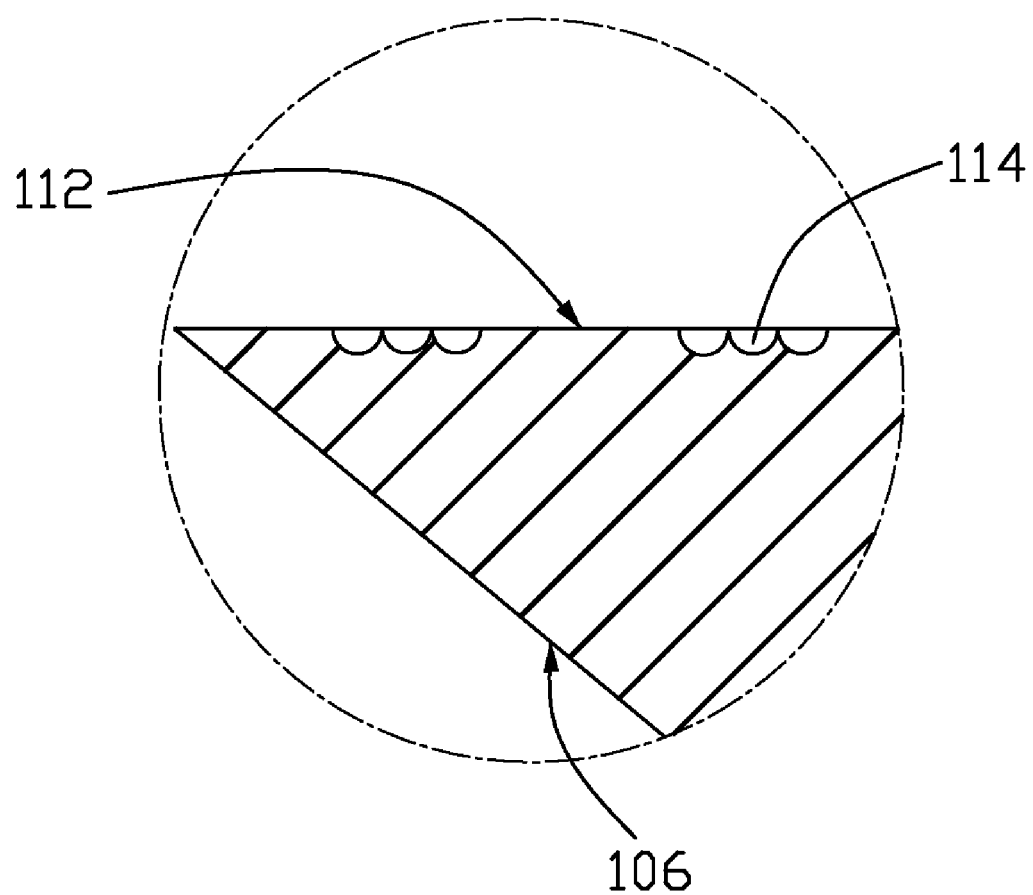
FIG. 3 is an enlarged view of a circled portion III shown in FIG. 2.

Referring to FIGS. 1 to 3, a light guide plate 100 having a block body in accordance with a first preferred embodiment is shown. The block body of the light guide plate 100 includes a bottom surface 102, a light emitting surface 104 opposite to the bottom surface 102, four spaced light incident surfaces 112, four fresnel lens portions 114 and a plurality of side surfaces 106.

The light guide plate 100 having a block body is a transparent plate and may be manufactured by an injection molding process. A material of the light guide plate 100 is selected from the group consisting of poly-methyl-methacrylate (PMMA) resin, polycarbonate resin and polyethylene resin.

The plurality of side surfaces 106 adjoins the bottom surface 102 and the light emitting surface 104. Reflective films may be applied to the plurality of side surfaces 106 to make light beams reflected by the plurality of side surfaces 106. A plurality of dots 108 are formed on the bottom surface 102, and the plurality of dots 108 are integrated with the light guide plate 100. Alternately, a plurality of V-shaped grooves may be formed on the bottom surface 102.

The four fresnel lens portions 114 are provided on the respective four spaced light incident surfaces 112 of the block body so as to couple light beams emitted from light sources (not shown) into the light guide plate 100. In this preferred embodiment, the four spaced light incident surfaces 112 and the bottom surface 102 are located on a same plane. Each of the four fresnel lens portions 114 includes a plurality of concentric-annular grooves formed on the respective light incident surfaces 112, as shown in FIG. 3.

Figure 4:
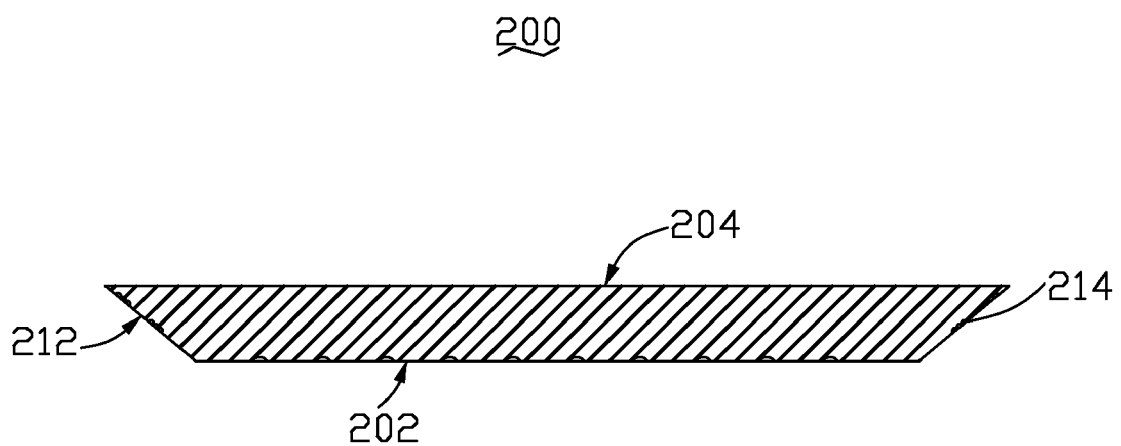
FIG. 4 is a schematic sectional view of a light guide plate according to a second preferred embodiment.

Referring to FIG. 4, a light guide plate 200 having a block body in accordance with a second preferred embodiment is shown. Difference between this preferred embodiment and the first preferred embodiment is that each of the four light incident surfaces 212 of this preferred embodiment obliquely interconnects the bottom surface 202 and the light emitting surface 204. Light beams emitted from the light sources are diverted by the fresnel lens portions 214 provided on the respective light incident surfaces 212 into the light guide plate 200, and exit from the light emitting surface 204.

Figure 5:
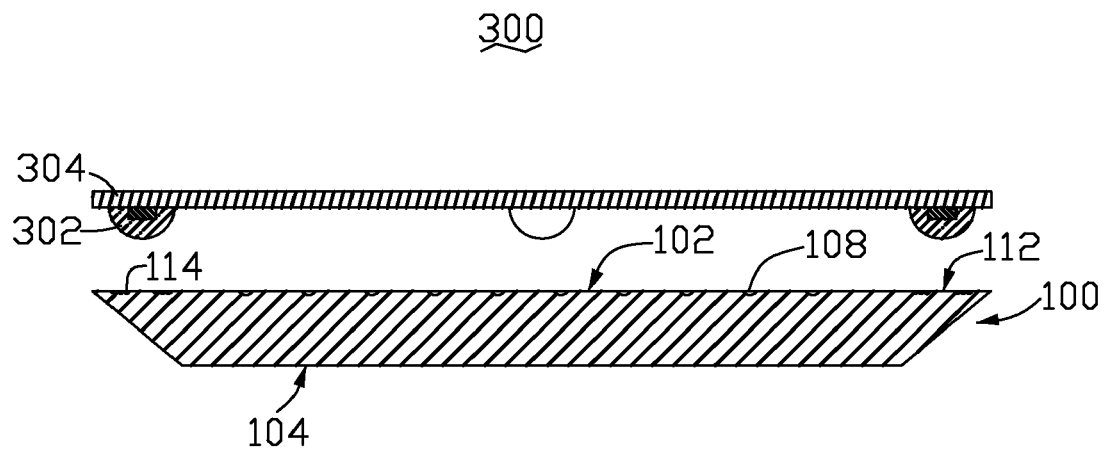
FIG. 5 is a schematic sectional view of a backlight module according to a third preferred embodiment.

Referring to FIG. 5, a direct-type backlight module 300 in accordance with a third preferred embodiment is shown. The backlight module 300 includes four light sources 302 with the light guide plate 100 having a block body provided by the first preferred embodiment.

Each of the light sources 302 faces toward its respective light incident surface 112. Light beams emitted from the light sources 302 are diverted into the light guide plate 100 by the fresnel lens portions 114. The dots 108 formed on the bottom surface 102 can totally eliminate internal reflection of the light beams, and make the light beams evenly exit from the light emitting surface 104 of the light guide plate 100. Preferably, the light sources 302 are formed integrally on a printed circuit board 304.

Each of the four light sources 302 are single-color LEDs. For example, the four light sources 302 can include a white LED for emitting white light, a red LED for emitting red light, a green LED for emitting green light, a blue LED for emitting blue light. Light beams emitted from the four different-color light sources 302 are mixed in the light guide plate 100 and exit from the light emitting surface 104. The exiting light beams with full-waveband of visible light are produced to ensure better color saturation and brightness of the backlight module 300.

Figure 6:
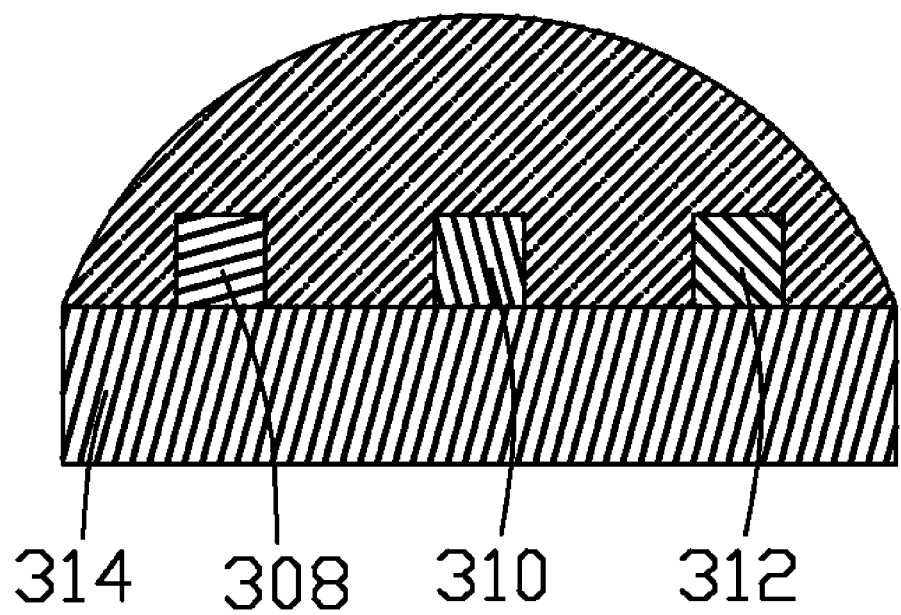
FIG. 6 is a schematic sectional view of a light emitting diode used in the preferred embodiments.

Besides, alternately the four light sources may use multi-color LEDs. For example, referring to FIG. 6, each of the four light sources includes a surface-mount device LED 306 (SMD-LED) having a red LED chip 308 for emitting red light, a green LED chip 310 for emitting green light and a blue LED 312 chip for emitting blue light therein.

Figure 7:
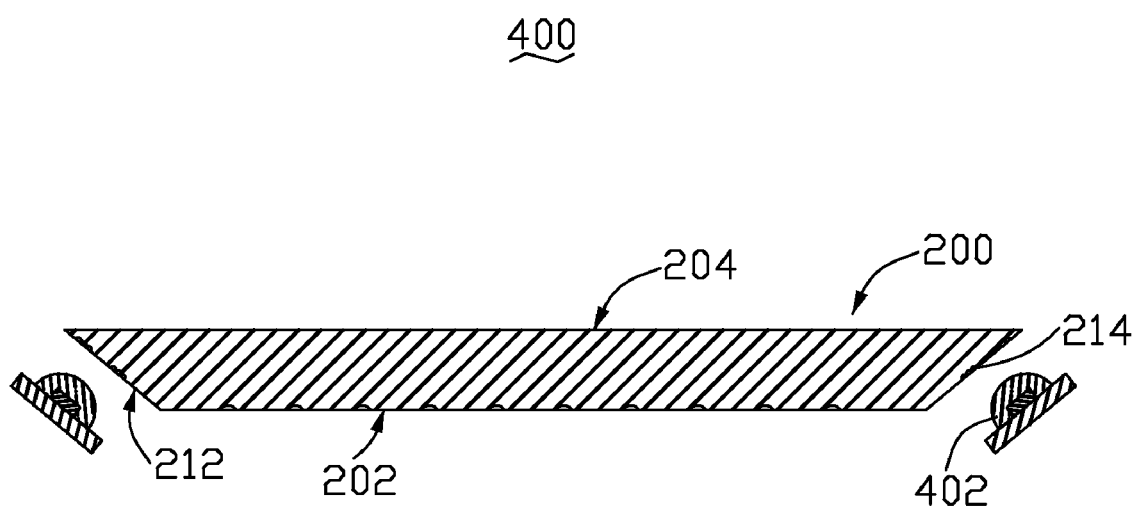
FIG. 7 is a schematic sectional view of a backlight module according to a fourth preferred embodiment.

Referring to FIG. 7, an edge-type backlight module 400 in accordance with a fourth preferred embodiment is shown. The edge-type backlight module 400 includes a plurality of light sources 402 and a light guide plate 200 having a block body provided by the second preferred embodiment. The plurality of light sources 402 may be single-color LEDs or multi-color LEDs described in the third preferred embodiment.

Since light incident surfaces 112, 212 provided with the fresnel lens portions 114, 214 are introduced into the light guide plate 100, 200 having a block body, light beams emitted from the LEDs are diverted into the light guide plate 100, 200, and totally mixed in the light guide plate 100, 200, and exit from the light emitting surface 104, 204. Therefore, the exiting light beams with full-waveband of visible light are produced to ensure better color saturation and brightness of the backlight module 300, 400.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A light guide plate having a block body, comprising:
   a bottom surface;
   a light emitting surface on an opposite side of the light guide plate to the bottom surface;
   at least three spaced light incident surfaces adjoining the bottom surface; and
   at least three fresnel lens portions provided on the respective at least three light incident surfaces of the block body.

2. The light guide plate as claimed in claim 1, wherein the block body has a plurality of dots or v-shaped grooves formed on the bottom surface thereof.

3. The light guide plate as claimed in claim 1, further comprising a plurality of reflective side surfaces adjoining the bottom surface and the light emitting surface.

4. The light guide plate as claimed in claim 3, wherein the light incident surfaces and the bottom surface are located on a same plane.

5. The light guide plate as claimed in claim 3, wherein each of the light incident surfaces obliquely interconnects the bottom surface and the light emitting surface.

6. The light guide plate as claimed in claim 1, wherein each of the fresnel lens portions comprises a plurality of concentric annular grooves formed on the respective light incident surface.

7. A backlight module, comprising:
   a light guide plate having a block body, the light guide plate comprising:
      a bottom surface;
      a light emitting surface on an opposite side of the light guide plate to the bottom surface;
      at least three spaced light incident surfaces adjoining the bottom surface; and
      at least three fresnel lens portions provided on the respective at least three light incident surfaces of the block body;
      and
   at least three light sources, each of the light sources facing toward the respective three spaced light incident surfaces.

8. The backlight module as claimed in claim 7, wherein the block body has a plurality of dots or v-shaped grooves formed on the bottom surface thereof.

9. The backlight module as claimed in claim 7, further comprising a plurality of reflective side surfaces adjoining the bottom surface and the light emitting surface.

10. The backlight module as claimed in claim 9, wherein the light incident surfaces and the bottom surface are located on a same plane.

11. The backlight module as claimed in claim 9, wherein the light incident surface obliquely interconnects the bottom surface and the light emitting surface.

12. The backlight module as claimed in claim 7, wherein each of the fresnel lens portions comprises a plurality of concentric annular grooves formed on the respective light incident surface.

13. The backlight module as claimed in claim 7, wherein the at least three light sources comprises a red light emitting diode for emitting red light, a green light emitting diode for emitting light, and a blue light emitting diode for emitting blue light.

14. The backlight module as claimed in claim 7, wherein each of the at least three light sources comprises a light emitting diode having a red light emitting chip for emitting red light, a green light emitting chip for emitting green light, and a blue light emitting chip for emitting blue light therein.

* * * * *